US008145230B2

United States Patent
Callaway, Jr. et al.

(10) Patent No.: US 8,145,230 B2
(45) Date of Patent: Mar. 27, 2012

(54) CONTEXT-IMAGE DISTRIBUTED SPECTRUM ALLOCATION SCHEME FOR COGNITIVE RADIOS

(75) Inventors: Edgar H. Callaway, Jr., Boca Raton, FL (US); David B. Taubenheim, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1001 days.

(21) Appl. No.: 12/112,568

(22) Filed: Apr. 30, 2008

(65) Prior Publication Data
US 2009/0275294 A1 Nov. 5, 2009

(51) Int. Cl.
*H04W 72/00* (2009.01)
*H04W 4/00* (2009.01)

(52) U.S. Cl. ......... 455/452.2; 455/1; 370/329; 370/480; 370/465

(58) Field of Classification Search .................. 455/424, 455/509, 500, 512, 515, 42, 452.2, 456.1, 455/447; 370/329, 328, 462, 338, 237, 480; 370/465; 375/132, 224, 260
See application file for complete search history.

(56) References Cited

U.S. PATENT DOCUMENTS

| | | | | |
|---|---|---|---|---|
| 7,957,451 B1* | 6/2011 | Baugh et al. | ................... | 375/132 |
| 2004/0047324 A1* | 3/2004 | Diener | ........................... | 370/338 |
| 2007/0189348 A1* | 8/2007 | Kovsh et al. | ............... | 372/45.01 |
| 2008/0130519 A1* | 6/2008 | Bahl et al. | ..................... | 370/254 |

OTHER PUBLICATIONS

Choi, Noun; Patel, Maulin; Venkatesan, S.—"A Full Duplex Multi-Channel MAC Protocol for Multi-hop Cognitive Radio Networks", 1st international Conference on Cognitive Radio Oriented Wireless Networks and Communications, Jun. 2006—5 pp.

Thoppian, M.; Venkatesan, S.; Prakash, R.; Chandrasekaran, R.—"MAC-Layer Scheduling in Cognitive Radio based Multi-hop Wireless Networks", International Symposium on a World of Wireless, Mobile and Multimedia Networks, Jun. 2006—10 pp.

* cited by examiner

*Primary Examiner* — Kiet Doan
(74) *Attorney, Agent, or Firm* — Barbara R. Doutre

(57) ABSTRACT

A method (300) and cognitive radio (CR) wireless device (102) are provided for dynamically accessing spectrum in an opportunistic spectrum access wireless communication system (100). The method includes: transmitting, from a CR wireless device, a signal (216) having a first bandwidth within an unoccupied portion of spectrum (206), and after a time interval (T3) following the transmitting, and upon determining that an adjacent spectral quantum is occupied, transmitting from the CR wireless device a signal (216) having a second bandwidth, the second bandwidth being less than the first bandwidth. The method doubles a rate of growth of bandwidth of a transmitted signal when a spectral quantum adjacent to one side of the signal is unoccupied and a spectral quantum adjacent to the other side of the signal is occupied. The method utilizes knowledge of location of the CR wireless device and of band-edges to intelligently use spectral fence quanta.

16 Claims, 6 Drawing Sheets

321
NO FENCE
QUANTA

323
BW = BW - 2

325
BW = BW - 1

327

329
YES FENCE
QUANTA

331
TWO FENCE
QUANTA

333
EXACTLY ONE
FENCE
QUANTUM

335
$T_g = 0$,
BW = BW + 2

337
$T_g \neq 0$,
BW = BW - 1

339
$T_g = 0$,
BW = BW
FENCE
QUANTUM
SHIFTS

CONTEXT-IMAGE DISTRIBUTED SPECTRUM ALLOCATION SCHEME FOR COGNITIVE RADIOS

CROSS-REFERENCE TO RELATED APPLICATION

The present patent application is related to co-pending and commonly owned U.S. patent application Ser. No. 11/857,911, entitled "Distributed Spectrum Allocation Scheme For Cognitive Radio", filed on Sep. 19, 2007, the entire teachings of which being hereby incorporated by reference.

TECHNICAL FIELD

This invention generally relates to wireless communication systems and more particularly to distributed spectrum allocation for cognitive radio systems.

BACKGROUND

Spectrum sharing has been proposed as a way to more efficiently use existing spectrum, and also to alleviate the spectrum scarcity that impedes new wireless services from being deployed. Cognitive radio is a promising technology that can allow users of spectrum to share spectrum with other users of the spectrum without causing harmful interference. Cognitive radio (CR) wireless devices perform spectrum (channel) sensing before accessing a channel.

Also, many spectrum allocation techniques utilize a centralized control. However, a centralized control has the disadvantage of presenting a single point of failure.

Further, even in a spectrum cleared of other users (e.g., cleared of incumbent users) achieving fair channel access among cooperating, yet independent, CR wireless devices can be problematic. The ability for a CR wireless device to quickly and efficiently join a CR system and access unused spectrum without having to undergo major changes to existing wireless networks has presented many challenges to designers of wireless communication systems. Particularly, in certain communication conditions CR wireless device data throughput can be reduced due to a particular CR spectrum allocation scheme used by a wireless communication system.

The term "spectral quantum" defines the smallest spectral bandwidth that a CR wireless device may occupy or, the smallest amount by which the bandwidth of a CR wireless device may be changed. When available spectrum is very wide relative to the size of a spectral quantum, a CR wireless device may take a long time to occupy the entire spectrum, even if there is no competition from other wireless devices. This access time may even exceed that needed to send all of the CR wireless device's available data. This problem occurs because of relatively slow growth (e.g., one quantum of spectrum per transmission) of the CR wireless device's occupied bandwidth. Because of this relatively slow growth, data throughput at the beginning of a communication session can be adversely affected.

As a second example, CR wireless devices operating on the edge of a spectrum band or adjacent to a fixed interferer, i.e., operating at a band-edge, can grow their signal only in one direction of spectrum (i.e., either higher or lower in frequency), away from the band-edge. That is, their signal growth is blocked in the direction of the band-edge. These CR wireless devices therefore grow their signal at half the rate of other unencumbered CR wireless devices' signals growing unencumbered by a band-edge, which can increase their signal occupied bandwidth toward both (high and low) sides into available spectrum. The band-edge CR wireless devices thus experience reduced bandwidth during their growth phase in comparison with that of unencumbered CR wireless devices, and, as a consequence, data throughput at the beginning of a communication session can be adversely affected.

As a third example, CR wireless devices operating next to a fixed limit, e.g., at a band-edge, may attempt spectrum growth next to such a fixed limit and therefore will maintain a fence quantum between the occupied signal bandwidth of the CR wireless device and the fixed limit. To maintain a fence quantum next to the fixed limit wastes available spectrum that could otherwise be used by CR wireless devices. This wasted spectrum can result in reduced data throughput for such CR wireless devices.

Therefore a need exists to overcome the problems with the prior art as discussed above.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
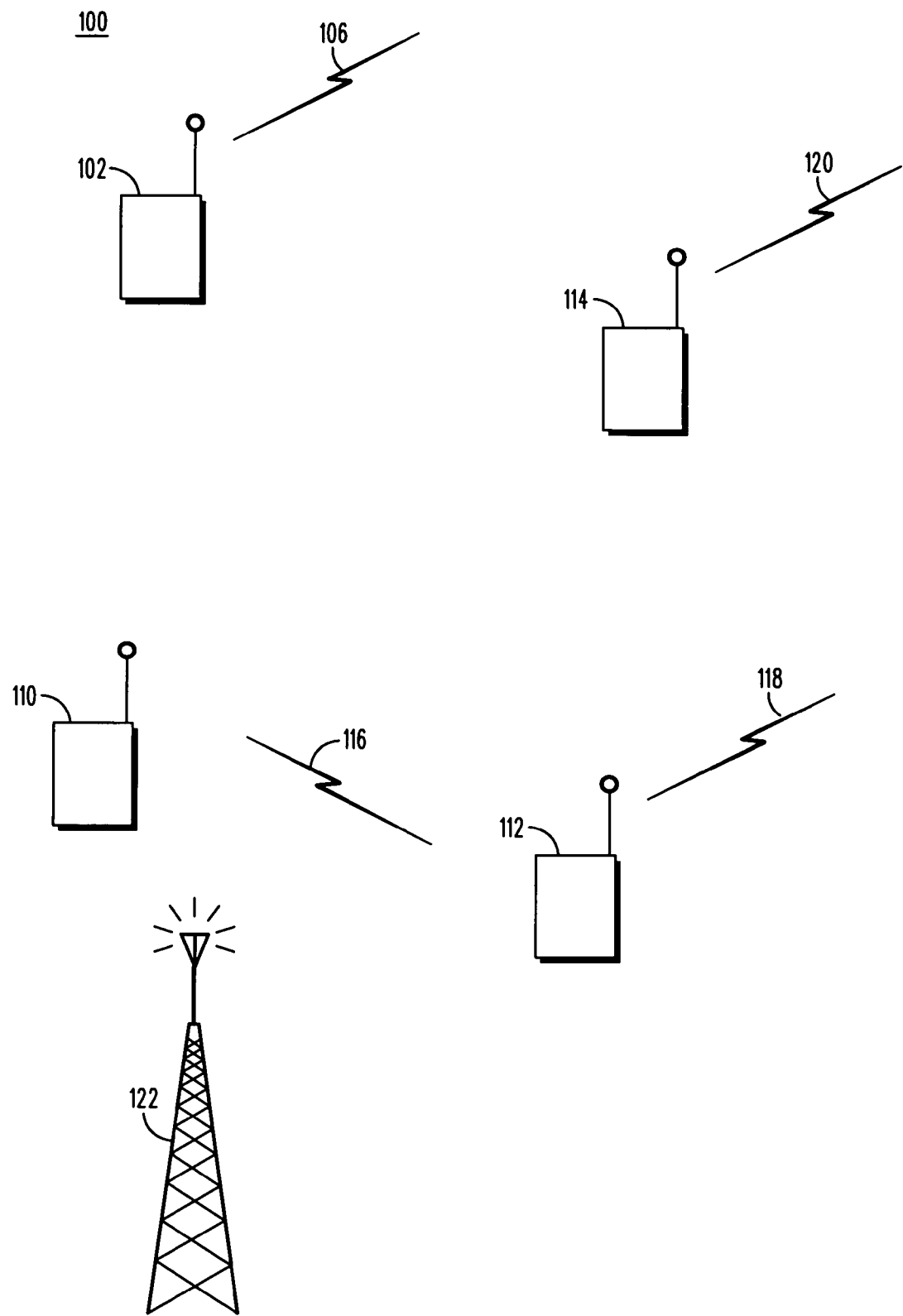
FIG. 1 is a block diagram view illustrating a plurality of cognitive radio (CR) wireless devices operating in accordance with various embodiments of the invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. Additionally, the invention shall have the full scope of the claims and shall not be limited by the embodiments shown below.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. It is further understood that the use of relational terms, if any, such as first, second, top and bottom, front and rear, and the like are used solely for distinguishing one entity or action from another, without necessarily requiring or implying any such actual relationship or order between such entities or actions.

For purposes of this application the term "wireless device" is intended to broadly cover many different types of devices that can wirelessly receive signals, and optionally can wirelessly transmit signals, and may also operate in a wireless communication system. For example, and not for any limitation, a wireless device can include (but is not limited to) any one or a combination of the following: a two-way radio, a cellular telephone, a mobile phone, a smartphone, a two-way pager, a wireless messaging device, a laptop/computer, automotive gateway, or a residential gateway. Additionally, for purposes of this application the term "CR wireless device" is intended to broadly cover wireless devices that can wirelessly communicate signals using cognitive radio communication schemes and techniques.

For purposes of this application the term "bandwidth" is defined as the spectrum occupied by, or available to be occupied by, a transmitted signal, and is not intended to be equated to the term "data rate" which is the number of bits transmitted per unit time. For purposes of this application, the term bandedge is defined as an outer spectral edge of a bandwidth occupied by, or available to be occupied by, a transmitted signal. For purposes of this application, the term "spectral quantum" is defined as the smallest spectral bandwidth that a CR wireless device may occupy or, equivalently, the smallest amount by which the bandwidth of a CR wireless device may be changed. The term "fence quanta" or "fence quantum" of a CR wireless device is defined as the spectral quanta, or spectral quantum, immediately above and/or below (in frequency) the transmitted signal of a CR wireless device; and is not intended to be equated to the term "guard-band" which typically refers to the unused bandwidth separating channels, employed, for example, to ensure that they do not interfere with one another. It is possible to have a single fence quantum on only one side of a transmitted signal, the other side of the transmitted signal's bandwidth abutting an adjacent signal's bandwidth. It is also possible to have no fence quanta present around a transmitted signal, with both sides of the transmitted signal's bandwidth abutting an adjacent signal's bandwidth. For purposes of this application, a narrowband signal is considered to be a signal having the width of one spectral quantum.

Briefly in accordance with one embodiment of the present invention, there is provided herein a method and apparatus for achieving fair channel access among cooperating, yet independent, cognitive radio (CR) wireless devices. A distributed channel access technique, one without centralized control, is achieved by introducing a signal bandwidth variable into the channel access technique. Specifically, by introducing a signal that immediately occupies a maximum bandwidth, or nearly a maximum bandwidth, of available unoccupied spectrum, the signal's bandwidth is immediately grown to fill, or nearly fill, available unoccupied spectrum bandwidth. Then, the signal's rate of growth slows, or even the signal's occupied bandwidth decreases, as the signal's occupied bandwidth is adjusted to more fairly share spectrum with cooperating yet independent CR wireless devices sharing distributed spectrum, as will be discuss in more detail below.

Additionally, according to one embodiment of the invention, by maintaining an unoccupied spectral quantum between each CR wireless device's transmission signal, a distributed spectrum sharing technique ensures that a CR wireless device just beginning transmissions in the CR frequency band will have spectrum from which to start growing (up to the maximum spectrum it can support, when the bandwidth of each CR wireless device has been reduced to one spectral quantum, and there is no available spectral quanta left).

Various channel access techniques according to the present invention apply to cognitive radio applications. One such technique starts by transmitting a signal occupying a maximum bandwidth, or nearly a maximum bandwidth, of available unoccupied channel spectrum in the largest contiguous free (unoccupied) segment of the available channel spectrum. The operational sequence then grows and/or adjusts the transmitted occupied bandwidth over time, at a rate that is a monotonically decreasing function of the occupied bandwidth, until there is only one spectral quantum (a fence quantum) between the CR wireless device and each of its adjacent spectral neighbors. It is noteworthy to point out that the growth rate of a signal bandwidth is a function of the occupied signal bandwidth, not time. Although the growth rate and bandwidth are related during the growth phase, these parameters are not related when the steady state mode is reached, where the bandwidth may stay substantially constant indefinitely as time moves on.

While the growth process continues (meaning that the fence quanta will be occupied by the transmitting CR wireless device from time to time), a second process begins, in which the fence quanta are monitored prior to each transmission. Should the fence quanta be found occupied, the CR wireless device reduces its occupied bandwidth during its next transmission so as to recreate a fence quantum between the CR wireless device and each of its spectrally adjacent neighbors.

If the CR wireless device occupies less bandwidth than one of its neighbors, it will occupy the fence quantum more often than the larger bandwidth occupying neighbor (since the growth rate is a decreasing function of occupied bandwidth). The CR wireless device will therefore cause the larger spectral occupying neighbor to reduce its occupied spectral bandwidth more often, while the CR wireless device increases its occupied bandwidth. The technique therefore works to substantially equalize the occupied bandwidth of all cooperating users that have equal quality of service requirements, when the steady state mode is reached.

Referring now to FIG. 1, according to one example, a plurality of active cognitive radio (CR) wireless devices 102, 110, 112, 114, are shown operating in a wireless communication system 100. This system 100 may also be referred to as an opportunistic spectrum access wireless communication system or a CR wireless communication system.

Also shown is a fixed wireless communication system 122 (e.g., a user having a fixed frequency occupancy) that operates in a spectrum that is adjacent to the spectrum of the wireless communication system 100, and therefore operates at a band-edge of the CR wireless communication system 100. The plurality of CR wireless devices 102, 110, 112, 114, may be part of the same network communicating with each other or may be independent devices from different services, users, owners, etc. Each of the plurality of CR wireless devices 102, 110, 112, 114, are actively transmitting signals 106, 116, 118 and 120, respectively, according to a medium access control (MAC) protocol for allocating spectrum between the CR wireless devices 102, 110, 112, 114. In accordance with this embodiment of the invention, each CR wireless device is capable of identifying open (unoccupied) frequency spectrum and transmitting at least a narrowband signal, i.e., a signal that is at least one spectral quantum in width, within a segment of the unoccupied frequency spectrum.

Figure 2:
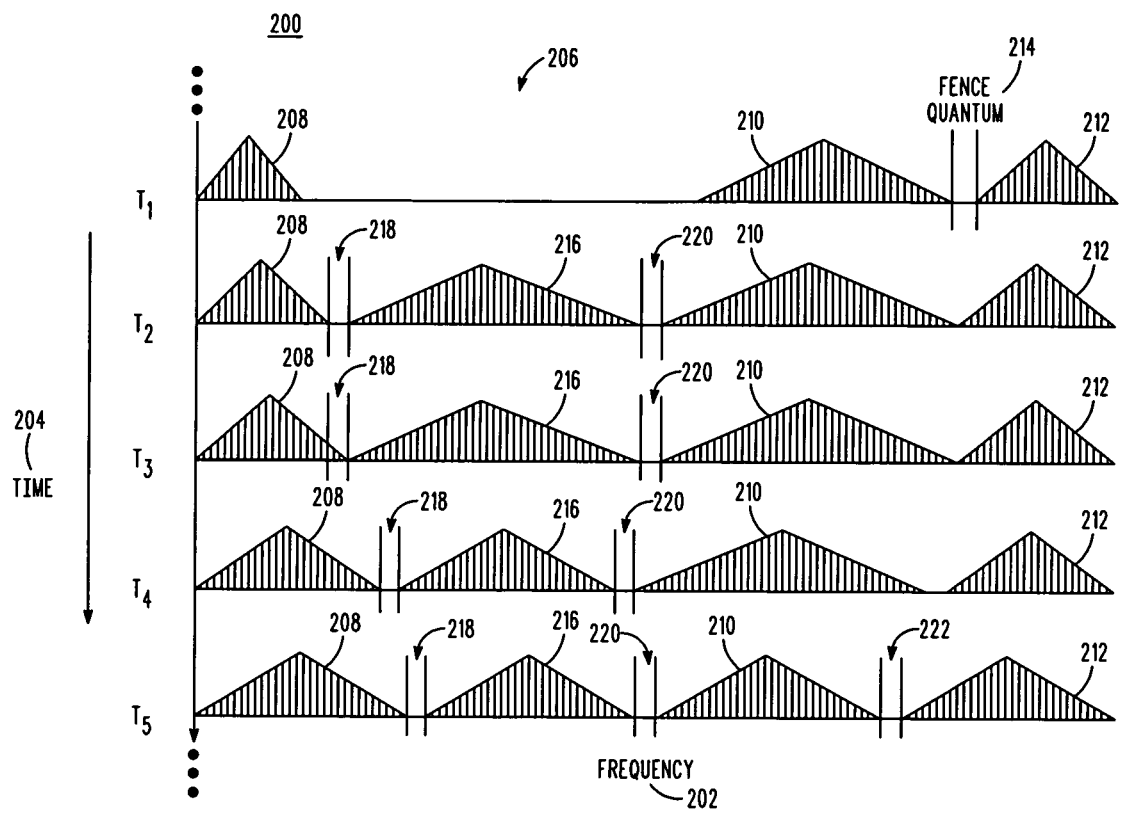
FIG. 2 is a frequency vs. time chart illustrating one example of trading signal bandwidth between CR wireless devices over time until achieving generally a steady state mode of operation in accordance with various embodiments of the invention.

FIG. 2 is a chart 200 of frequency 202 vs. time 204 illustrating one example of trading signal bandwidth between CR wireless devices over time, indicated by time intervals T1, T2, T3, T4, T5, etc., until achieving generally a steady state mode of operation in accordance with various embodiments of the invention. Referring to FIGS. 1 and 2, CR wireless devices 110, 112, 114, at time interval T1, are already in a process of adjusting/widening their respective signals, as indicated by signals 208, 210, and 212, respectively. A fence quantum 214 separates the transmitted signals 210, 214, of two CR wireless devices 112, 114. The CR wireless device 102, at time interval T2, introduces a transmission signal 216 within an unoccupied spectrum segment 206. In this example, an active CR wireless device 102 identifies open (unoccupied) frequency spectrum 206 and transmits a signal 216. Specifically, the transmitted signal 216 immediately at the start of communication occupies a maximum bandwidth, or nearly a maximum bandwidth, of available unoccupied channel spectrum in the largest contiguous free (unoccupied) segment 206 of the available channel spectrum, as shown in the second time interval T2. In this example, the transmitted signal 216 is nearly a maximum bandwidth because it starts being bounded on either side of the signal 216 by two fence quanta 218, 220. This method of operation for the CR wireless device 102 improves its rate of growth by increasing from the start the occupied bandwidth (and potential data throughput) of the transmitted signal 216 of the CR wireless device 102, and without sacrificing fair, independent spectrum access.

While the growth process for the CR wireless device 102 continues (meaning that the fence quanta 218, 220, may be occupied by the signal 216 of the transmitting CR wireless device 102 from time to time, a second process begins, in which the fence quanta 218, 220, are monitored prior to each transmission. Should the fence quanta 218, 220, be found occupied, as indicated in time interval T3, the CR wireless device 102 reduces the occupied bandwidth of its signal 216, as indicated at time interval T4, during its next transmission so as to recreate fence quanta 218, 220, between the transmitted signal 216 of the CR wireless device 102 and the transmitted signals 208, 210, of each of its spectrally adjacent neighbors 110, 112.

Each of the two CR wireless devices 110, 112, widens its transmitted signal 208, 210, until a fence quantum 218, 220, is reached between the three transmitted signals 208, 216, and 210, of the three CR wireless devices 110, 102, 112, respectively, as illustrated at time interval T3.

Eventually, a fence quantum 218, 220, 22, separates each active CR wireless device's transmission signal 208, 216, 210, 212, from adjacent spectral neighboring transmission signals on either side. The neighboring active CR wireless devices 102, 110, 112 114, attempt to increase their respective bandwidths at rates that are a function of each CR wireless device's occupied signal 208, 216, 210, 212, bandwidth, while decreasing their respective signal 208, 216, 210, 212, bandwidths when necessary to maintain their fence quanta 218, 220, 222, such that, over time 204, the bandwidth amongst all the active CR wireless devices 102, 110, 112, 114, substantially equilibrate with fence quanta 218, 220, 222, therebetween, as shown in time interval T5.

In accordance with various embodiments of the invention, the growth rate and starting bandwidths of each CR wireless device 102, 110, 112, and 114, may vary to accommodate different quality of service (QoS) requirements for each CR wireless device 102, 110, 112, 114. According to one embodiment, a starting signal 216 bandwidth will be substantially equal to a maximum bandwidth, or nearly a maximum bandwidth, of unoccupied spectrum segment 206, without regard to the QoS requirements for the particular CR wireless device 102.

With reference to the continuing example of FIGS. 1 and 2, to achieve steady state mode of channel access among the CR wireless devices 102, 110, 112, 114, control is independently distributed amongst the CR wireless devices 102, 110, 112, 114, without the use of a single centralized control. By each CR wireless device verifying its own QoS requirements, substantially equal sharing of spectrum is provided to CR wireless devices having equal QoS requirements. In cases where the QoS are not equal, spectrum can be assigned to the CR wireless devices with weighted proportion to each CR wireless device's QoS needs. A distributed channel access technique is thus provided that, in the steady state mode of operation, produces substantially equal sharing of spectrum among CR wireless devices having similar QoS requirements.

A CR wireless device with higher QoS requirements can have those requirements met, for example, by two mechanisms. First, the growth rate of high-QoS CR wireless devices can be accelerated. Secondly, if a maximum bandwidth, or near maximum bandwidth is not initially occupied, according to certain embodiments, these CR wireless devices can at least start from a larger initial occupied bandwidth (e.g., several spectral quanta or more) instead of a narrow band signal. New CR wireless devices entering the wireless communication system 100 will have a place in the spectrum from which to start growing when at least one fence quantum is available.

Figure 3:
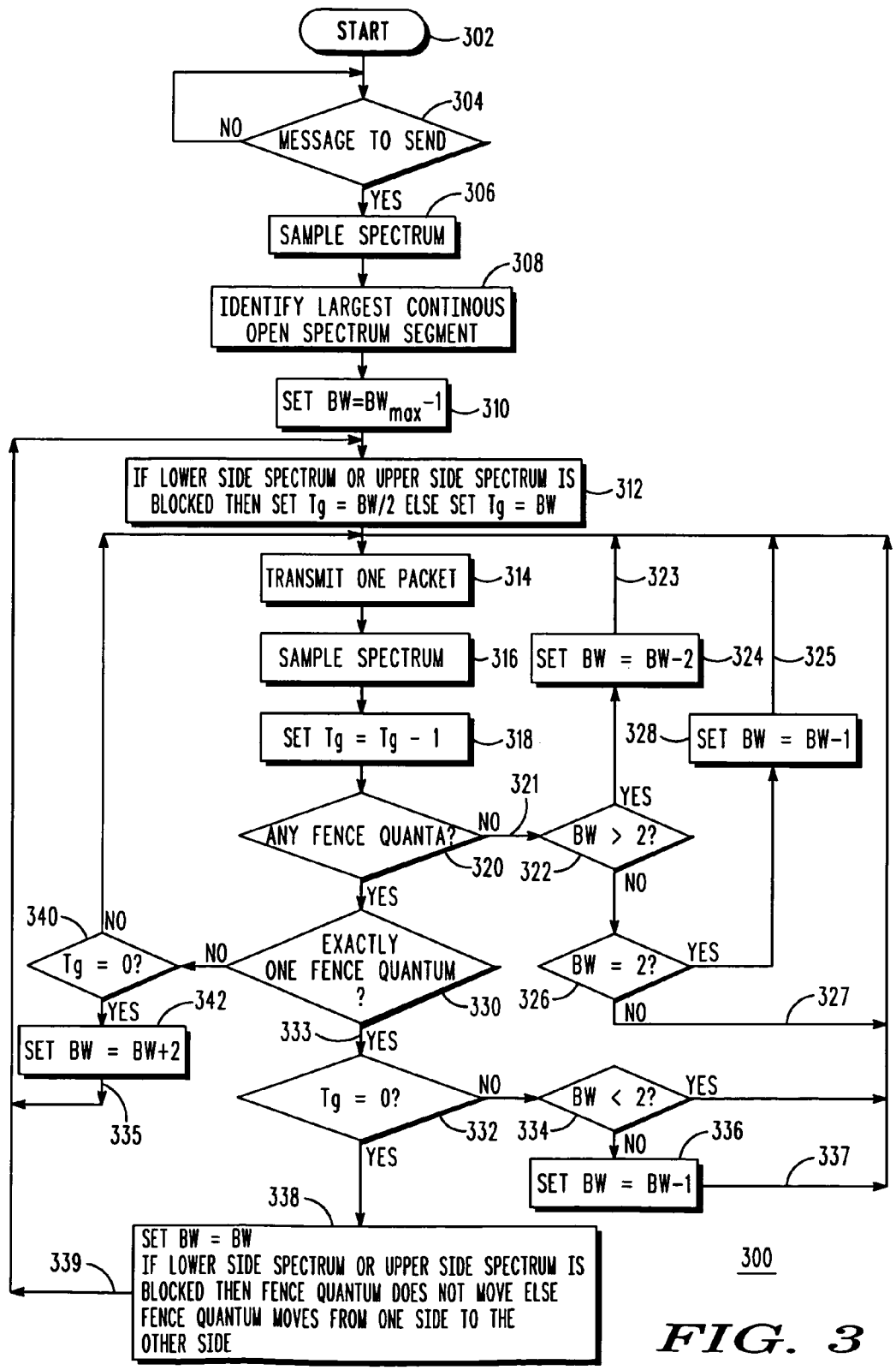
FIG. 3 is an operational flow diagram illustrating one example of a technique for a CR wireless device to share spectrum with other CR wireless devices in accordance with various embodiments of the invention.

FIG. 3 is a flow diagram illustrating one example of a MAC technique for a CR wireless device to share spectrum with other CR wireless devices in accordance with one embodiment of the invention. The operational sequence begins, at step 302, with a CR wireless device, such as CR wireless device 102 in FIG. 1, and determining that it desires to send a message, at step 304. Upon determining to send a message, at step 304, the CR wireless device 102 samples frequency spectrum, at step 306, to identify the center of the largest continuous open (unoccupied) spectrum segment 206, at step 308. Upon identifying the center of this largest continuous open spectrum, the CR wireless device 102 sets the bandwidth for its transmission signal 216 to this maximum bandwidth, or nearly maximum bandwidth, of this unoccupied spectrum segment 206, at step 310.

A timer for tracking time for the signal 216 to grow (Tg) is set to the bandwidth (Tg=BW), at step 312, unless growth of the signal 216 into the adjacent spectrum, either on the lower side or the upper side of the signal 216, is blocked. If growth of the signal 216 is blocked either on the lower side or the upper side of the signal 216, then the timer for tracking time to grow (Tg) is set to BW/2. This accelerates the growth time for signals 216 that have growth blocked on either the lower side or the upper side of the signal 216. In this way, the remaining unblocked side of the signal 216 will move at twice the rate of the side of other signals of other CR wireless devices having equivalent bandwidth and that have unencumbered growth from both sides of their signals. Therefore, the signal 216 will have the same bandwidth growth rate as signals from other CR wireless devices that have unencumbered growth from both sides of their signals.

The growth of a signal can be blocked, for example, when the signal is at a band-edge. A band-edge can include, for example, the signal being on the edge of a spectrum band or adjacent to a fixed interferer, such as a user having a fixed frequency occupancy.

Also, note that while the current example maintains a single timer for tracking time for the signal 216 to grow (Tg), which can be set to the bandwidth (Tg=BW) or to the bandwidth divided by two (Tg=BW/2), this is not the only way that a CR wireless device may operate to adjust its growth rate. As another example, the CR wireless device can maintain two timers for tracking time for the signal 216 to grow, i.e., one timer for tracking rate of growth of the signal into unoccupied spectrum below the lower side of the signal and a second timer for keeping track of a rate of growth of the signal into unoccupied spectrum above the upper side of the signal. These two rates of growth can be different from each other. If the growth of the signal is blocked into the lower side of the signal (or alternatively the upper side of the signal), for example, then the rate of growth timer for the other side of the signal can be divided by two thereby doubling the rate of growth into the unoccupied spectrum from the other side of the signal. These are just two non-limiting examples of how growth can be tracked and adjusted for a signal according to various embodiments of the present invention.

Continuing with the present example, the CR wireless device 102 begins transmitting a signal (e.g. a packet), at a maximum bandwidth, or near maximum bandwidth, of a largest unoccupied spectrum segment 206 in the CR wireless communication system band, at step 314. Then, at step 316, the CR wireless device 102 samples the spectrum.

The growth timer (Tg) is decremented, at step 318, in response to the packet transmission. The CR wireless device 102 checks the spectrum sampled, at step 316, checking whether any fence quanta exist, at step 320. Depending on the existence, and amount of, fence quanta in the sampled spectrum, the spectrum sharing operational sequence adjusts the transmission signal's bandwidth until the growth counter times out.

Figure 4:
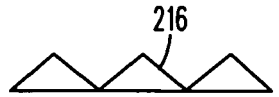
FIG. 4 illustrates examples of various signal bandwidth adjustments and fence locations that may occur during the example technique shown in FIG. 3.
Figure 4:
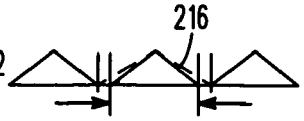
Figure 4:
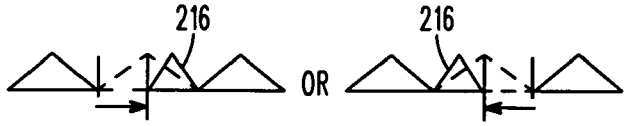
Figure 4:
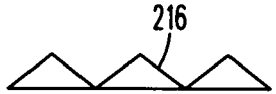
Figure 4:
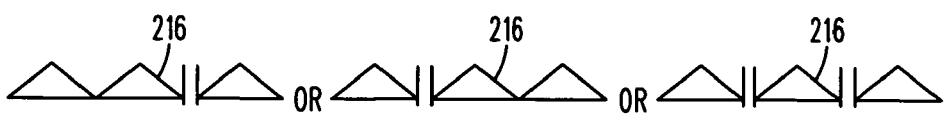
Figure 4:
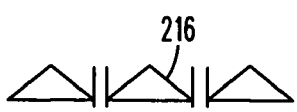
Figure 4:
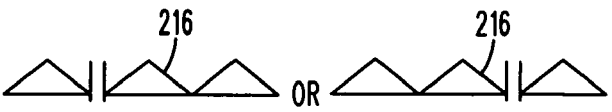
Figure 4:
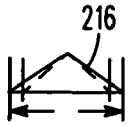
Figure 4:
Figure 4:
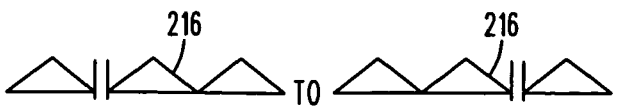

FIG. 4 will now be discussed in conjunction with the flow diagram of FIG. 3, to provide further examples of the various signal bandwidth adjustments and fence quantum locations.

If no fence quanta exist, at step 320, meaning neighboring signals are right next to the transmitted signal. (FIG. 4, 321) then the bandwidth is checked to determine whether it has a spectral quanta greater than two (BW>2), at step 322. If the BW spectral quanta is greater than two, at step 322, then the transmitted signal's bandwidth is decreased by a spectral quanta of two, at step 324 (thus attempting to form fence quanta on either side of the CR wireless devices' 102 transmission signal 216 (FIG. 4, 323). The operational sequence of FIG. 3 then returns to CR wireless device 102 transmitting a new packet, at step 314. According to one embodiment, the CR wireless device decreases the transmitted signal's bandwidth at a rate that is less than a rate of signal bandwidth growth used by the CR wireless device when both spectral quanta adjacent to the transmitted signal occupied bandwidth of the CR wireless device are unoccupied. In this way, bandwidth would be decreased slower than the CR wireless device grows bandwidth of its transmitted signal occupied bandwidth.

If, at step 322, the spectral bandwidth quanta was not greater than two, but equal to two (BW=2), at step 326, then it decrements the spectral bandwidth quanta by one (BW=BW−1), at step 328. This results in fence quanta on either side of the transmission signal 216 (FIG. 4, 325).

If the spectral bandwidth is not equal to two spectral quanta, at step 326, leaving the only possibility that BW=1, then the bandwidth of the transmission signal 216 remains at one (FIG. 4, 327), because one spectral quantum is the minimum possible bandwidth, according to the present example, and a packet is sent, at step 314.

Returning to step 320, the operational sequence considers the scenario when fence quanta exist by checking, at step 330, whether exactly one fence quantum exists. If exactly one fence quantum does not exist, meaning there are two fence quanta, then the growth counter is checked, at step 340. If the growth counter has not reached zero, at step 340, then a new packet is transmitted, at step 314. If the growth counter has reached zero, at step 340, then the transmission signal's 216 bandwidth is increased by two spectral quanta (BW=BW+2), at step 342 (FIG. 4, 335), and the operational sequence returns to step 312. At step 312 the growth counter is set to the new bandwidth (Tg=BW), or alternatively set to the new bandwidth divided by 2 (Tg=BW/2) if growth is blocked toward the lower side or the upper side of the signal 216, prior to a new packet being sent, at step 314.

If the fence quanta is exactly one, at step 330, this means that a single fence abuts the band-edge on one side of the transmitted signal 216 and no fence exists on the other side (i.e., an adjacent signal abuts the transmission signal 216 on the other band-edge) (FIG. 4, 333). The growth counter is then checked, at step 332, and if the counter has not reached zero, then the bandwidth is checked to see if the bandwidth is less than two spectral quanta (BW<2), at step 334.

If the bandwidth is less then two spectral quanta, at step 334, this is an indication that there is not enough room to decrease the bandwidth of the transmission signal 216, and the operational sequence, at step 314, sends another packet. If, at step 334, it is determined that the bandwidth is large enough (i.e. BW is equal to two or greater than two), then the bandwidth is decreased by one spectral quantum (BW=BW−1), at step 336, to create a fence quanta on both sides of the transmission signal 216 (FIG. 4, 337) prior to transmitting a new packet, at step 314. According to one embodiment, the CR wireless device can decrease the transmitted signal's bandwidth at a rate that is less than a rate of signal bandwidth growth used by the CR wireless device when both spectral quanta adjacent to the transmitted signal occupied bandwidth of the CR wireless device are unoccupied. In this way, bandwidth would be decreased slower than the CR wireless device grows bandwidth of its transmitted signal occupied bandwidth.

If the growth counter did reach zero, at step 332, then the bandwidth of the transmission signal 216 remains unchanged, at step 338, but fence quantum is shifted over such that it is in between the transmission signal 216 and the previously adjacent signal (FIG. 4, 339), unless growth of the signal 216 toward the spectrum beyond the lower side or the upper side of the signal 216 is blocked. If such growth is blocked, then the fence quantum location remains unchanged. The operational sequence then, at step 312, sets the growth counter to bandwidth (Tg=BW), or alternatively sets the growth counter to the bandwidth divided by two (Tg=BW/2) if the growth of the signal 216 toward the spectrum beyond the lower side or the upper side of the signal 216 is blocked. Then, a new packet is transmitted, at step 314.

Accordingly, by maintaining an unoccupied spectral quantum between each CR wireless device, the novel operational sequence, in accordance with the invention, ensures that a CR wireless device just beginning transmission in the CR frequency band will have a maximum, or nearly a maximum, of unoccupied spectrum from which to start transmitting signal thereby likely increasing the data throughput during the start of transmission. The signal bandwidth of the CR wireless device then can continue to grow, and/or to adjust, up to a maximum bandwidth the spectrum can support for the CR wireless devices operating in the CR frequency band, eventually reaching a steady state mode of operation for the CR wireless devices sharing the CR frequency band.

In the case where QoS parameters are considered, the time to grow (Tg) counter within the operational sequence of FIG. 3 can be set to:

$$Tg=BW/QoS \text{ where QoS=low=1}.$$

The higher the value of the QoS parameter, the lower will be the starting Tg counter value. The Tg counter will thus reach zero more quickly. Over time, therefore, with a high QoS value the decision, at step 340, will be "Yes" more often than with a lower value of QoS, leading to step 342 more often, and faster growth. To ensure integer values are achieved for each calculation of Tg, the calculation of (BW/QoS) can be rounded up thereby ensuring that Tg is always at least one. Thus, for example, when BW=7 and QoS=6, then Tg=2.

In another embodiment of the present invention, the transmitting device limits its bandwidth to be less than a predetermined maximum bandwidth threshold. This may be desirable, for example, when the device is incapable of transmitting signals with bandwidths greater than the threshold. In this embodiment, the decision in steps 332 and 340 is augmented to also consider the predetermined threshold. To achieve a "Yes" result in these steps, the growth counter must reach zero and the bandwidth must be less than the threshold; otherwise, the "No" decision is made.

In another embodiment, after the initial setting of the signal bandwidth the maximum, or nearly the maximum, bandwidth of a largest unoccupied segment of the CR frequency band, the growth rate of the signal bandwidth can increase at a rate of one quantum per transmission until a neighboring signal presents itself. Thus, in cases with wide open frequency spectrum, the rate at which a signal is transmitted grows very quickly at the start of a transmission and continues when additional unoccupied spectrum is available until growth is slowed down due to the presence of another signal, separated from the transmitted signal by one fence quanta, presents itself.

In another embodiment of the present invention, the transmitting device does not sample spectrum in steps 306 and 316, but instead determines the presence or absence of fence quanta from information received from a third party. This third party may be, for example, a spectrum broker or agent, or a database of spectrum occupancy information.

While the counter Tg has been described in terms of being decremented to a value of zero, the counter may alternatively be set to another threshold or be incremented to an alternative threshold as well.

Exemplary CR Wireless Device

Figure 5:
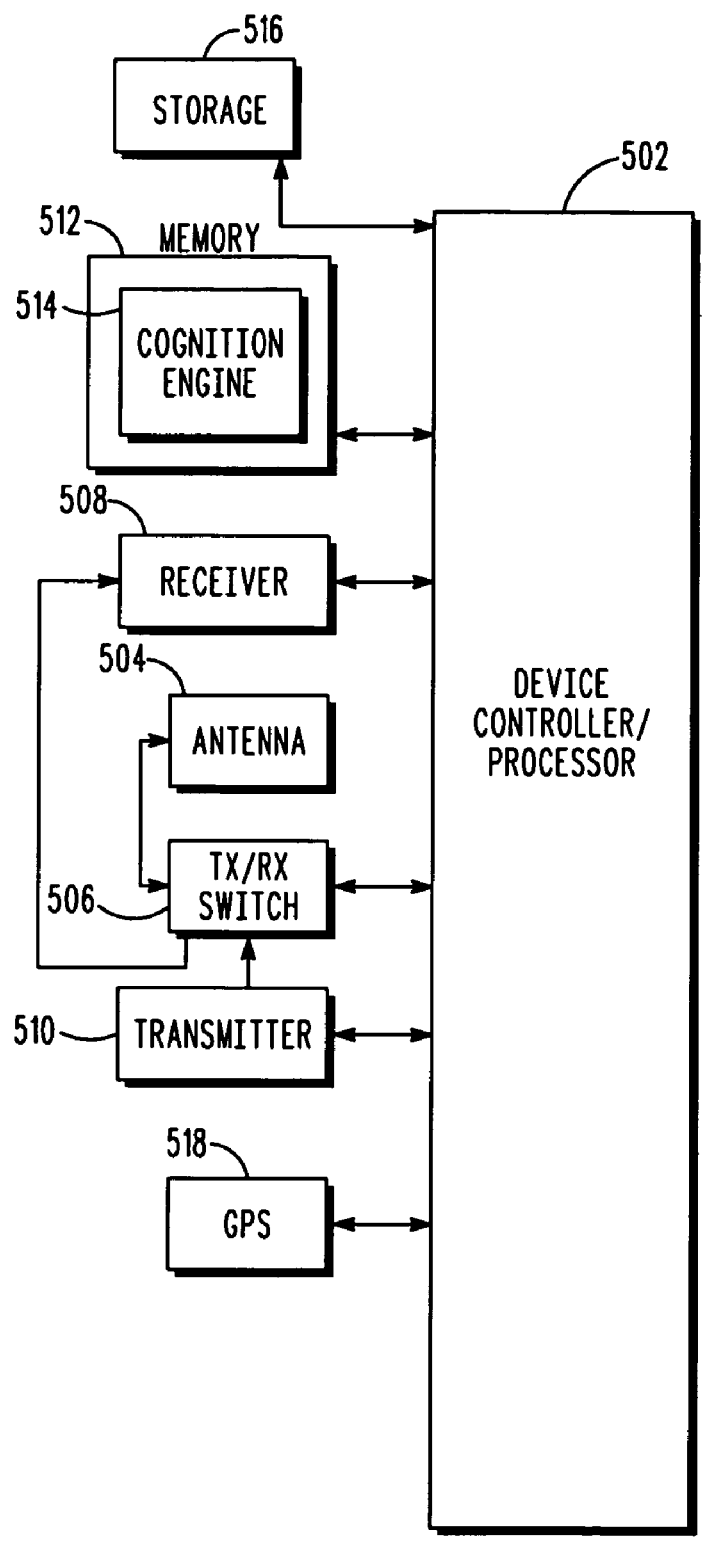
FIG. 5 is a block diagram illustrating an example of a CR wireless device according to one embodiment of the present invention.

Referring now to FIG. 5, a more detailed view of an example of a CR wireless device is shown. It is assumed that the reader is familiar with wireless communication devices. To simplify the present description, only that portion of a wireless communication device that is relevant to the present invention is discussed. The CR wireless device shown in FIG. 5 operates under the control of a device controller/processor 502, that controls the sending and receiving of wireless communication signals. In receive mode, the device controller 502 electrically couples an antenna 504 through a transmit/receive switch 506 to a receiver 508. The receiver 508 decodes the received signals and provides those decoded signals to the device controller 502.

In transmit mode, the device controller 502 electrically couples the antenna 504, through the transmit/receive switch 506, to a transmitter 510. It should be noted that in one embodiment, the receiver 508 and the transmitter 510 are a dual mode receiver and a dual mode transmitter for receiving/transmitting over various access networks providing different air interface types. In another embodiment a separate receiver and transmitter are used for each of type of air interface. A memory 512 includes, among other things, a cognition engine routine 514. An operational process, such as illustrated in FIG. 3, is provided by interoperation between the cognition engine 514 and the device controller 502. The CR wireless device also includes non-volatile storage memory 516 for storing, for example, an application waiting to be executed (not shown) on the CR wireless device.

Additionally, according to one embodiment of the invention, a Global Positioning System (GPS) receiver 518 is coupled with the device controller 502 to provide location information to the CR wireless device. This is only one non-limiting example of a means of determining location of the CR wireless device. There are many other ways for a CR wireless device to determine its location. The GPS receiver 518 is associated with the CR wireless device, and not necessarily in the CR wireless device. The device controller 502 can receive data from the GPS receiver 518. The CR wireless device in this way can determine where it is located, such as relative to a geographic location grid and/or map. Additionally, the non-volatile storage memory 516, according to this embodiment, can store predefined representations of geographic locations of prohibited wireless communication bands and known band-edges of a CR wireless communication system that can vary by geographic location. For example, the non-volatile storage memory 516 can store a geo-location database for these band-edges. Fixed transmitters, such as illustrated by the fixed wireless communication system 122 shown in FIG. 1, can create a band-edge for a CR wireless communication system in or around a certain geographic region.

The CR wireless device compares the GPS data received from the GPS receiver 518 to predefined locations of prohibited wireless communication bands and known band-edges of a CR wireless communication system that are stored in the non-volatile storage memory 516, such as in a geo-location database stored in the non-volatile memory 516. The CR wireless device therefore can use this information to its advantage and grow into available spectrum immediately adjacent to the band-edge and without using a fence quantum spectrum to separate the signal of the CR wireless device from the band-edge.

Figure 6:
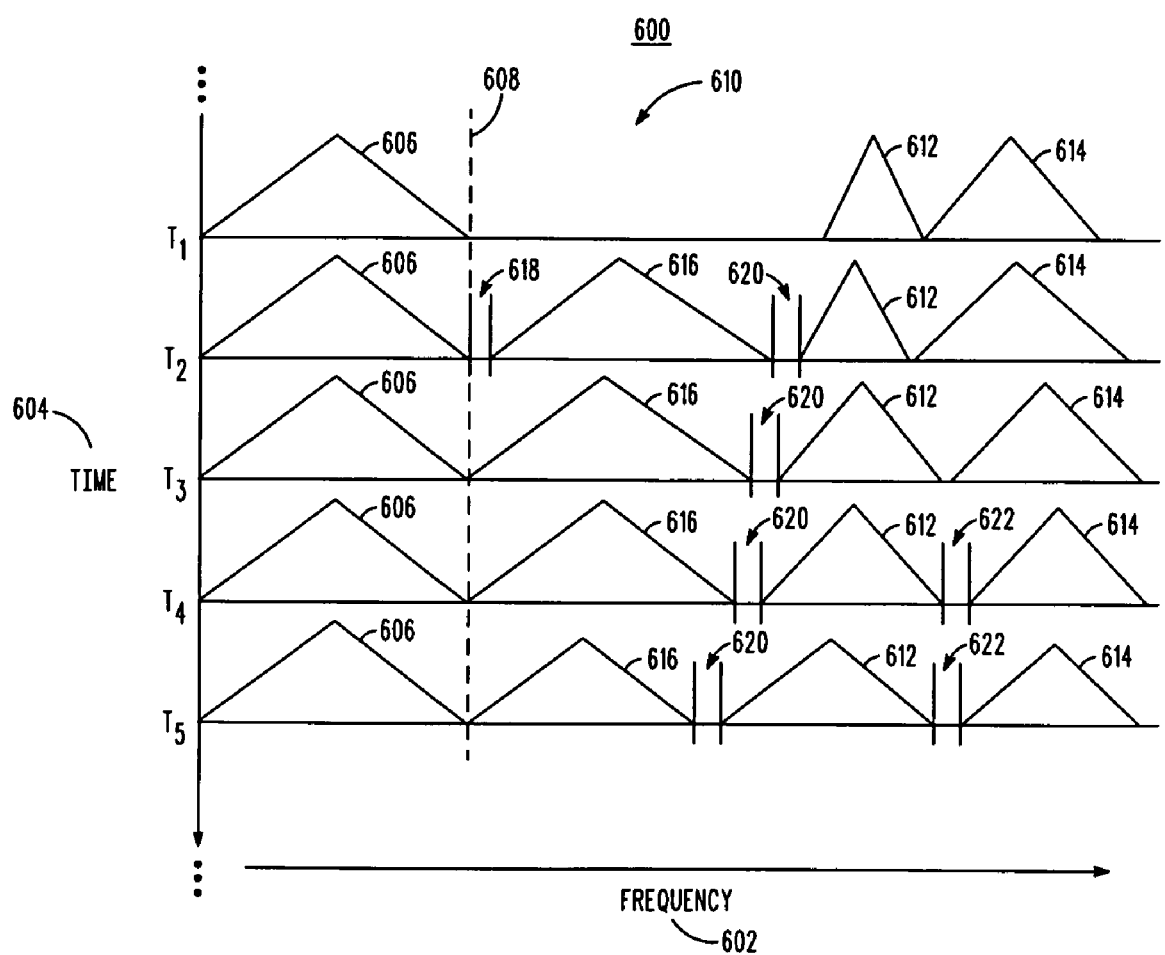
FIG. 6 is a frequency vs. time chart illustrating a second example of trading signal bandwidth between CR wireless devices over time until achieving generally a steady state mode of operation in accordance with various embodiments of the invention.

For example, as illustrated in FIG. 6, a chart 600 of frequency 602 vs. time 604 illustrates a second example of trading signal bandwidth between CR wireless devices over time, indicated by time intervals T1, T2, T3, T4, T5, etc., until achieving generally a steady state mode of operation in accordance with various embodiments of the invention. Referring to FIGS. 1 and 6, a fixed signal 606 is located at one end of the CR frequency band. Such a fixed signal, for example, is transmitted from the fixed wireless communication system 122. A band-edge 608 therefore limits bandwidth growth of signals transmitted from CR wireless devices operating in proximity to the fixed wireless communication system 122.

According to this second example, CR wireless devices 112, 114, at time interval T1, are already in a process of adjusting/widening their respective signals, as indicated by signals 612 and 614, respectively. A CR wireless device 102, at time interval T2, introduces a transmission signal 616 within an unoccupied spectrum segment 610. In this example, an active CR wireless device 102 identifies open (unoccupied) frequency spectrum 610 and transmits a signal 616. Specifically, the transmitted signal 616 immediately at the start of communication occupies a maximum bandwidth, or nearly a maximum bandwidth, of available unoccupied channel spectrum in the largest contiguous free (unoccupied) segment 610 of the available channel spectrum, as shown in the second time interval T2. In this example, the transmitted signal 616 is nearly a maximum bandwidth because it starts being bounded on either side of the signal 616 by two fence quanta 618, 620. This method of operation for the CR wireless device 102 improves its rate of growth by increasing from the start the occupied bandwidth (and potential data throughput) of the transmitted signal 216 of the CR wireless device 102, and without sacrificing fair, independent spectrum access.

When a CR wireless device determines, for example, that the CR wireless device is in proximity to the fixed wireless communication system 122, a band-edge 608 (as shown in FIG. 6) will be known by the CR wireless device. The CR wireless device therefore can use this information to its advantage and grow into the spectral quantum 618 adjacent to it (i.e., occupy the fence quantum), as shown at time interval T3. This is an intelligent way for the CR wireless device 102 to utilize fencing and to avoid maintaining a fence spectrum quantum adjacent to a band-edge thereby increasing the use of available unoccupied spectrum. This will allow more unoccupied spectrum to be used by one or more CR wireless devices sharing spectrum in a CR frequency band. This can result in higher data throughput for the one or more CR wireless devices.

In similar fashion to the example provided above with reference to FIG. 2, at time intervals T4 and T5, the signals 616, 612, and 614, eventually will reach equilibrium at a steady state of operation. Fence quanta 620, 622, separate the signals 616, 612, and 614. However, according to this embodiment, no fence quantum is needed to separate the signal 616 of the CR wireless device 102 and the signal 606 of the fixed wireless communication system 122 at the band-edge. This can result in higher data throughput for the one or more CR wireless devices 102, 112, 114, sharing the CR frequency band.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a wireless device, for dynamically accessing spectrum in an opportunistic spectrum access wireless communication system, the method comprising:
   transmitting, from a wireless device, a signal having a first bandwidth being equal to or nearly equal to a bandwidth of an unoccupied portion of spectrum within the unoccupied portion of spectrum; and
   after a time interval following the transmitting, and upon determining that an adjacent spectral quantum is occupied, transmitting from the wireless device a signal having a second bandwidth, wherein the second bandwidth is less than the first bandwidth, wherein
   in response to determining that only one spectral quantum is unoccupied, the wireless device growing its transmitted signal occupied bandwidth toward the unoccupied spectral quantum at a third rate of growth and attempting to grow its transmitted signal occupied bandwidth toward the other of the two spectral quanta at a fourth rate of growth, the third rate being greater than the fourth rate.

2. The method of claim 1, wherein the transmitting of the signal having the first bandwidth being at substantially a start of a transmission of a communication from the wireless device.

3. The method of claim 1, wherein the wireless device is a cognitive radio (CR) wireless device, and wherein the CR wireless device operating in a CR wireless communication system.

4. A method, with a wireless device, for dynamically accessing spectrum in an opportunistic spectrum access wireless communication system, the method comprising:
   determining, with a wireless device, whether only one spectral quantum of two spectral quanta adjacent to a transmitted signal occupied bandwidth of the wireless device is unoccupied; and
   in response to determining that only one spectral quantum is unoccupied, the wireless device growing its transmitted signal occupied bandwidth toward the unoccupied spectral quantum at a first rate that is at least double a second rate of signal bandwidth growth used by the wireless device when both of the two spectral quanta adjacent to the transmitted signal occupied bandwidth of the wireless device are unoccupied, wherein
   in response to determining that only one spectral quantum is unoccupied, the wireless device growing its transmitted signal occupied bandwidth toward the unoccupied spectral quantum at a third rate of growth and attempting to grow its transmitted signal occupied bandwidth toward the other of the two spectral quanta at a fourth rate of growth, the third rate being greater than the fourth rate.

5. The method of claim 4, wherein the third rate of growth is double the fourth rate of growth.

6. The method of claim 4, wherein the first rate of growth is double the second rate of growth.

7. The method of claim 4, wherein the wireless device is a cognitive radio (CR) wireless device, and wherein the CR wireless device is operating in a CR wireless communication system.

8. A method, with a wireless device, for dynamically accessing spectrum in an opportunistic spectrum access wireless communication system, the method comprising:
   determining, with a wireless device, whether a spectral quantum is at a band-edge of an opportunistic spectrum access wireless communication system; and
   when the spectral quantum is determined to be at a band-edge, the wireless device limiting growth of its transmitted signal occupied bandwidth up to a spectral quantum adjacent to the band-edge and without an unoccupied fence quantum between the band-edge and the spectrum quantum occupied by the wireless device transmitted signal bandwidth, wherein
   the determining, with the wireless device, determines whether a spectral fence quantum adjacent to the wireless device transmitted signal occupied bandwidth is occupied by a user having a fixed frequency occupancy, and if in response to the spectral fence quantum is being determined to be occupied by a user having a fixed frequency occupancy, the wireless device limiting growth of its transmitted signal occupied bandwidth UP to a spectral quantum adjacent to the spectral fence quantum that is occupied by the user having a fixed frequency occupancy.

9. The method of claim 8, wherein the wireless device is a cognitive radio (CR) wireless device, and wherein the CR wireless device is operating in a CR wireless communication system.

10. The method of claim 8, further comprising:
when the occupied spectral quantum is determined to be occupied by a user not having a fixed frequency occupancy and the occupied spectral quantum not being at a band-edge, the wireless device decreasing the occupied bandwidth of its transmitted signal occupied bandwidth to create an unoccupied spectral fence quantum between the occupied spectral quantum and the transmitted signal occupied bandwidth of the wireless device.

11. The method of claim 10, wherein the wireless device decreasing the occupied bandwidth of its transmitted signal occupied bandwidth to create the unoccupied spectral fence quantum, does so at a rate that is less than a rate of signal bandwidth growth used by the wireless device when both spectral quanta adjacent to the transmitted signal occupied bandwidth of the wireless device are unoccupied.

12. The method of claim 8, wherein the determining comprises:
determining a geographic location of the wireless device; and
comparing the determined geographic location of the wireless device with one or more stored representations of geographic location associated with one or more band-edges of the opportunistic spectrum access wireless communication system.

13. The method of claim 12, wherein the determining of a geographic location of the wireless device is determined by receiving data from a GPS receiver associated with the wireless device.

14. A cognitive radio (CR) wireless device comprising:
a memory;
a wireless transmitter;
a wireless receiver;
a controller/processor, communicatively coupled with the memory, the wireless transmitter, and the wireless receiver; and a cognition engine, communicatively coupled with the controller/processor, and being adapted to:
transmitting, with the wireless transmitter, a signal having a first bandwidth being equal to or nearly equal to a bandwidth of an unoccupied portion of spectrum within the unoccupied portion of spectrum in an opportunistic spectrum access wireless communication system; and
after a time interval following the transmitting, and upon determining that an adjacent spectral quantum, adjacent to the transmitted signal having the first bandwidth, is occupied, transmitting with the wireless transmitter a signal having a second bandwidth, wherein the second bandwidth is less than the first bandwidth, wherein the transmitting of the signal having the first bandwidth being at substantially a start of a transmission of a communication from the CR wireless device.

15. A cognitive radio (CR) wireless device comprising:
a memory;
a wireless transmitter;
a wireless receiver;
a controller/processor, communicatively coupled with the memory, the wireless transmitter, and the wireless receiver; and
a cognition engine, communicatively coupled with the controller/processor, and being adapted to:
determining, with a wireless device, whether only one spectral quantum of two spectral quanta adjacent to the transmitted signal occupied bandwidth of the wireless device is unoccupied; and
in response to determining that only one spectral quantum is unoccupied, the wireless device growing a transmitted signal occupied bandwidth toward the unoccupied spectral quantum at a first rate that is at least double a second rate of signal bandwidth growth used by the wireless device when both of the two spectral quanta adjacent to a transmitted signal occupied bandwidth of the wireless device are unoccupied.

16. A cognitive radio (CR) wireless device comprising:
a memory at least for storing a geo-location database containing representations of geographic location of one or more band-edges of an opportunistic spectrum access wireless communication system;
a wireless transmitter;
a wireless receiver;
a GPS receiver for providing data identifying the geographic location of the GPS receiver;
a controller/processor, communicatively coupled with the memory, the wireless transmitter, the wireless receiver, and the GPS receiver; and
a cognition engine, communicatively coupled with the controller/processor, and being adapted to:
determining whether a spectral quantum is at a band-edge of an opportunistic spectrum access wireless communication system, including:
receiving data from the GPS receiver;
determining a geographic location of the wireless device at least in part from the data received from the GPS receiver; and
comparing the determined geographic location of the CR wireless device with one or more stored representations, that are stored in the memory, of geographic location associated with one or more band-edges of the opportunistic spectrum access wireless communication system; and
when the spectral quantum is determined to be at a band-edge, limiting growth of an occupied bandwidth of a signal transmitted by the wireless transmitter up to a spectral quantum adjacent to the band-edge and without an unoccupied fence quantum between the band-edge and the spectrum quantum occupied by the wireless device transmitted signal bandwidth.

* * * * *